(12) United States Patent
Sitwell (10) Patent No.: US 12,303,042 B2
(45) Date of Patent: May 20, 2025

(54) EXCLUSIVE DUAL-GATED DISPENSER

(71) Applicant: Simon Sitwell, Toronto (CA)

(72) Inventor: Simon Sitwell, Toronto (CA)

( * ) Notice: Subject to any disclaimer, the term of this patent is extended or adjusted under 35 U.S.C. 154(b) by 0 days.

(21) Appl. No.: 18/288,854

(22) PCT Filed: May 13, 2022

(86) PCT No.: PCT/CA2022/050761
§ 371 (c)(1),
(2) Date: Oct. 30, 2023

(87) PCT Pub. No.: WO2022/236430
PCT Pub. Date: Nov. 17, 2022

(65) Prior Publication Data
US 2024/0206648 A1 Jun. 27, 2024

Related U.S. Application Data

(60) Provisional application No. 63/188,973, filed on May 14, 2021.

(51) Int. Cl.
*A47F 1/035* (2006.01)
*G01F 11/20* (2006.01)

(52) U.S. Cl.
CPC .............. *A47F 1/035* (2013.01); *G01F 11/20* (2013.01)

(58) Field of Classification Search
CPC .......... A47F 1/035; G01F 11/10; G01F 11/20; G01F 11/24; G01F 11/261; G01F 11/268; G01F 11/282
See application file for complete search history.

(56) References Cited

U.S. PATENT DOCUMENTS 2,584,781 A * 2/1952 Beatty ................... G01F 11/24
222/242
3,005,578 A * 10/1961 Mainicri ............... G01F 11/263
222/548

(Continued)

FOREIGN PATENT DOCUMENTS

CA 772028 A 11/1967
CA 2192808 C 8/2002

OTHER PUBLICATIONS

Extended European Search Report for EP Application No. 22806175.0, dated Sep. 30, 2024, 7 pages.

(Continued)

*Primary Examiner* — Paul R Durand
*Assistant Examiner* — Randall A Gruby
(74) *Attorney, Agent, or Firm* — KDW Firm PLLC (57) ABSTRACT

The present disclosures provides a dispensing device, comprising: a feeder portion configured to couple with a reservoir portion storing a material to be dispensed and to receive the material from the reservoir portion; a first rotatable gate disposed at an end of the feeder portion opposite the reservoir portion; an adjustable-volume measuring chamber disposed at an outlet side of the first rotatable gate; and a second rotatable gate disposed at an end of the adjustable-volume measuring chamber opposite the first rotatable gate. Each of the first and second rotatable gates are rotatable between open and closed position to permit or prevent the flow of material to be dispensed. The configuration of two rotatable gates ensure that only a desired amount/volume of the material to be dispensed can enter the adjustable-volume measuring chamber and be subsequently dispensed. A method of operating the dispensing device is also disclosed.

19 Claims, 6 Drawing Sheets

(56) References Cited

U.S. PATENT DOCUMENTS

| | | | |
|---|---|---|---|
| 4,071,171 A * | 1/1978 | Bassignani | G01F 11/46 222/305 |
| 4,174,058 A * | 11/1979 | Bassignani | G01F 11/24 222/452 |
| 4,345,700 A * | 8/1982 | Souza | G01F 11/46 222/452 |
| 4,832,235 A * | 5/1989 | Palmer | G01F 11/24 222/548 |
| 4,961,521 A | 10/1990 | Eckman | |
| 5,495,962 A * | 3/1996 | Nomura | G01F 11/46 222/452 |
| 7,451,901 B2 | 11/2008 | Ranney | |
| 7,555,362 B2 | 6/2009 | Broussard | |
| 7,878,376 B2 | 2/2011 | Ben Shlomo | |
| 8,210,401 B2 | 7/2012 | McGuyer | |
| 8,245,883 B2 | 8/2012 | Luchinger | |
| 8,666,543 B2 | 3/2014 | MacVittie | |
| 9,322,693 B2 | 4/2016 | Shepard | |
| 10,203,235 B1 * | 2/2019 | Gottfried | B65D 51/245 |
| 11,365,999 B2 * | 6/2022 | Battle | G01F 11/268 |
| 11,768,095 B2 * | 9/2023 | Battle | G01F 11/263 222/1 |
| 2015/0336719 A1 | 11/2015 | Bradley | |
| 2015/0346011 A1 | 12/2015 | Shepard | |
| 2021/0102827 A1 | 4/2021 | Battle | |
| 2023/0175877 A1 * | 6/2023 | Vine | G01F 15/001 222/368 |

OTHER PUBLICATIONS

International Search Report and Written Opinion for Application No. PCT/CA2022/050761 dated Jul. 14, 2022.

* cited by examiner

EXCLUSIVE DUAL-GATED DISPENSER

CROSS-REFERENCE TO RELATED APPLICATIONS

This application claims priority to U.S. Provisional Application No. 63/188,973, filed on May 14, 2021, the entire contents of which is incorporated herein by reference.

TECHNICAL FIELD

The present disclosure relates to the dispensing of measured amounts of granular substances, powders, or liquid materials.

BACKGROUND

Measuring and dispensing substances using the conventional method of measuring spoons, pouring, or scooping can result in measurement inaccuracy, spillage, and cross-contamination. Devices have been proposed to eliminate the need for measuring spoons but still introduce either inaccuracy, spillage, or an inordinate number of steps.

Accordingly, an additional, alternative, and/or improved dispenser that enable measuring and dispensing of substances remains highly desirable.

SUMMARY

In accordance with one aspect of the present disclosure, a dispensing device is disclosed, comprising: a feeder portion configured to couple with a reservoir portion storing a material to be dispensed and to receive the material from the reservoir portion; a first rotatable gate disposed at an end of the feeder portion opposite the reservoir portion, the first rotatable gate rotatable between an open position that permits flow of the material to be dispensed out of the reservoir portion, and a closed position that prevents flow of the material to be dispensed out of the reservoir portion; an adjustable-volume measuring chamber disposed at an outlet side of the first rotatable gate, the adjustable-volume measuring chamber configured to receive material to be dispensed, the adjustable-volume measuring chamber being adjustable to change a volume of material that can be received; and a second rotatable gate disposed at an end of the adjustable-volume measuring chamber opposite the first rotatable gate, the second rotatable gate rotatable between an open position that permits flow of the material to be dispensed out of the adjustable-volume measuring chamber, and a closed position that prevents flow of the material to be dispensed out of the adjustable-volume measuring chamber.

In some aspects, the adjustable-volume measuring chamber is rotatable between a first position, a second position, and a third position, and wherein rotation of the adjustable-volume measuring chamber causes rotation of both the first rotatable gate and the second rotatable gate.

In some aspects, the first rotatable gate and the second rotatable gate are configured at respective ends of the adjustable-volume measuring chamber such that when the adjustable-volume measuring chamber is in the first position, the first rotatable gate is in the open position and the second rotatable gate is in the closed position, when the adjustable-volume measuring chamber is in the second position, the first rotatable gate is in the closed position and the second rotatable gate is in the closed position, and when the adjustable-volume measuring chamber is in the third position the first rotatable gate is in the closed position and the second rotatable gate is in the open position.

In some aspects, each of the first and second rotatable gates respectively comprise a fixed portion with at least one aperture and a rotatable portion with a respective at least one aperture, wherein in the open position the at least one aperture of the rotatable portion coincides with the at least one aperture of the fixed portion, and in the closed position each of the at least one aperture of the rotatable portion do not coincide with any of the at least one aperture of the fixed portion.

In some aspects, the rotatable portion of the second rotatable gate is integrated with the adjustable-volume measuring chamber.

In some aspects, the fixed portion of the first rotatable gate is integrated with the feeder portion.

In some aspects, the feeder portion comprises a plurality of rails, and the fixed portion of the second rotatable gate comprises a plurality of sliders that interface with the plurality of rails and are configured to slide vertically within the plurality of rails as the volume of the adjustable-volume measuring chamber is adjusted.

In some aspects, the rotatable portion of the first rotatable gate comprises a plurality of tabs, and wherein the adjustable-volume measuring chamber comprises a plurality of tab rails that engage the plurality of tabs.

In some aspects, the fixed portion of the first rotatable gate comprises a plurality of detents that prevent over-rotation when the plurality of tabs hit the detents.

In some aspects, each of the first and second rotatable gates respectively comprise a plurality of rotatable blades rotatable between the open and closed positions, each blade having a rotator peg on a first surface thereof and an actuator peg on a second surface thereof.

In some aspects, each of the first and second rotatable gates comprise a respective mounting disk having rotator peg holes corresponding to rotator pegs of the plurality of blades, and wherein the rotator pegs of the plurality of blades are mounted to the corresponding rotator peg holes of the respective mounting disk.

In some aspects, the mounting disk of the first rotatable gate is integrated with the feeder portion.

In some aspects, the feeder portion comprises a plurality of rails, and the mounting disk of the second rotatable gate comprises a plurality of legs that interface with the plurality of rails and are configured to slide vertically within the plurality of rails as the volume of the adjustable-volume measuring chamber is adjusted.

In some aspects, each of the first and second rotatable gates further comprise a respective actuator disk having a plurality of actuator slots corresponding to actuator pegs of the plurality of blades, and wherein the actuator pegs of the plurality of blades are mounted in corresponding actuator slots of the respective actuator disk.

In some aspects, each actuator slot comprises an actuating portion and a delayed-open portion, and wherein a respective blade is in the closed position when the actuator peg is within the delayed-open portion.

In some aspects, the actuator disk of the second rotatable gate is integrated with the adjustable-volume measuring chamber.

In some aspects, the actuation disk of the first rotatable gate comprises a plurality of tabs, and wherein the adjustable-volume measuring chamber comprises a plurality of tab rails that engage the plurality of tabs.

In some aspects, the respective actuator disks further comprise a plurality of rotation pegs, and the respective mounting disks comprise corresponding rotation slots for receiving a respective rotation peg and allowing movement of the rotation peg within the rotation slot as the actuator disk rotates.

In some aspects, the dispensing device comprises the reservoir portion.

In accordance with another aspect of the present disclosure, a method of operating a dispensing device is disclosed, comprising: adjusting an adjustable-volume measuring chamber of the dispensing device to a desired volume, wherein the dispensing device comprises: a feeder portion configured to couple with a reservoir portion storing a material to be dispensed and to receive the material from the reservoir portion; a first rotatable gate disposed at an end of the feeder portion opposite the reservoir portion, the first rotatable gate rotatable between an open position that permits flow of the material to be dispensed out of the reservoir portion, and a closed position that prevents flow of the material to be dispensed out of the reservoir portion; the adjustable-volume measuring chamber disposed at an outlet side of the first rotatable gate, the adjustable-volume measuring chamber configured to receive material to be dispensed, the adjustable-volume measuring chamber being adjustable to change a volume of material that can be received; and a second rotatable gate disposed at an end of the adjustable-volume measuring chamber opposite the first rotatable gate, the second rotatable gate rotatable between an open position that permits flow of the material to be dispensed out of the adjustable-volume measuring chamber, and a closed position that prevents flow of the material to be dispensed out of the adjustable-volume measuring chamber, rotating the adjustable-volume measuring chamber to a first position to fill the adjustable-volume measuring chamber with the desired volume of material to be dispensed, wherein rotation of the adjustable-volume measuring chamber causes rotation of both the first rotatable gate and the second rotatable gate, and wherein in the first position, the first rotatable gate is in the open position and the second rotatable gate is in the closed position; rotating the adjustable-volume measuring chamber to a second position to stop flow of the material to be dispensed out of the reservoir portion, wherein in the second position, the first rotatable gate is in the closed position and the second rotatable gate is in the closed position; and rotating the adjustable-volume measuring chamber to a third position to dispense the material to be dispensed out of the adjustable-volume measuring chamber, wherein in the third position the first rotatable gate is in the closed position and the second rotatable gate is in the open position.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present disclosure provides a dispensing device and associated method of operating the dispensing device. The dispensing device comprises a feeder portion configured to couple with a reservoir portion storing a material to be dispensed and to receive the material from the reservoir portion; a first rotatable gate disposed at an end of the feeder portion opposite the reservoir portion; an adjustable-volume measuring chamber disposed at an outlet side of the first rotatable gate; and a second rotatable gate disposed at an end of the adjustable-volume measuring chamber opposite the first rotatable gate. Each of the first and second rotatable gates are rotatable between open and closed position to permit or prevent the flow of material to be dispensed. Advantageously, the configuration of two rotatable gates can be used to ensure that only a desired amount/volume of the material to be dispensed can enter the adjustable-volume measuring chamber and be subsequently dispensed. A gate does not begin to open until the other gate has completely closed. In this manner, only the measured amount of material that has entered the adjustable-volume measuring chamber is dispensed since there is never unimpeded flow from the reservoir to outside the dispenser. The dispensing device thus provides an exclusive dual-gated dispenser that ensures that an accurate amount of material is dispensed, while preventing spillage and cross-contamination.

The configuration of the first and second rotatable gates may in particular be such that rotating the adjustable-volume measuring chamber rotates both the first and second rotatable gates simultaneously. Rotating the adjustable-volume measuring chamber in a given direction may open one gate while closing the other. The particular configuration of rotating the adjustable-volume measuring chamber to cause rotation of both the first and second rotatable gates to move the respective gates between different positions advantageously facilitates use of the dispensing device as users are not required to rotate each gate independently and are not required to switch out different gate components at different times of use.

The dispensing device in the present disclosure may be used in a range of applications, including but not limited to the dispensing of measured amounts of granular substances, spices, powders, or liquid materials.

Embodiments are described below, by way of example only, with reference to FIGS. 1-11.

Figure 9:
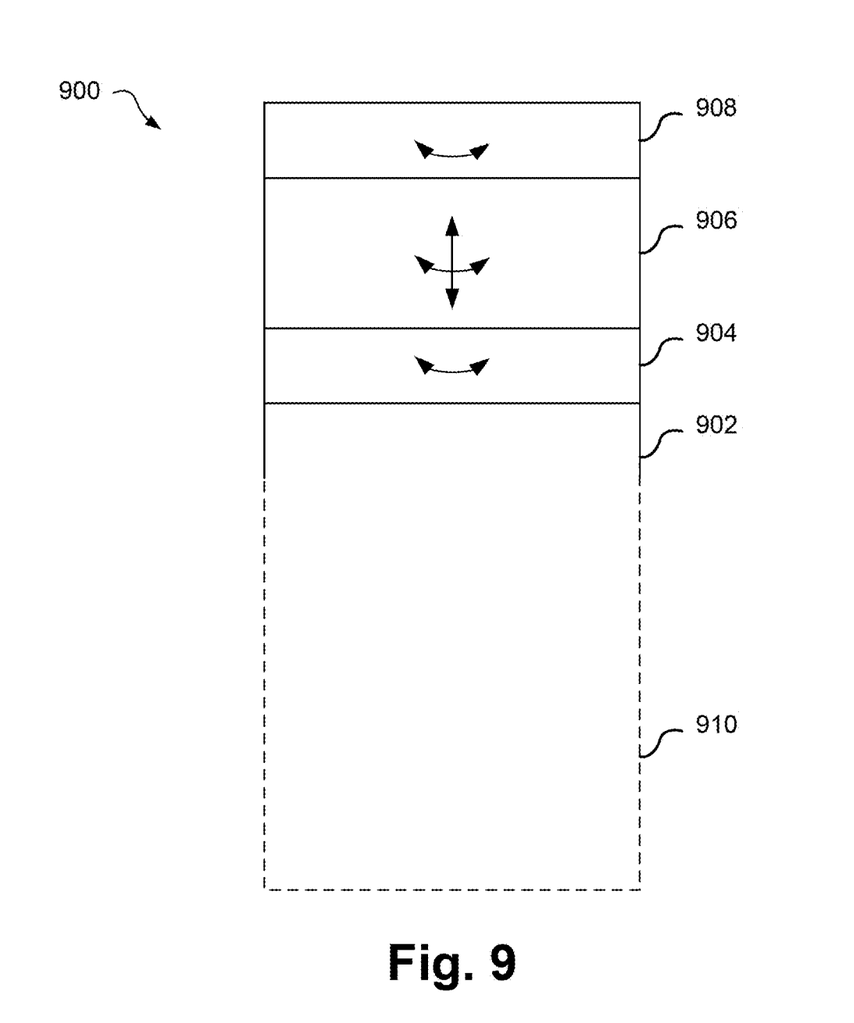
FIG. 9 shows a schematic diagram of a dispensing device in accordance with the present disclosure.

Reference is made to FIG. 9, which shows a schematic diagram of a dispensing device 900 in accordance with the present disclosure. The dispensing device 900 comprises a feeder portion 902 that is configured to couple with a reservoir portion 910 of a container storing a material to be dispensed (not shown), which may for example be granular substances, powders, or liquid materials. The feeder portion 902 may be coupled to the reservoir portion 910 of the container using a threaded connection, for example. The feeder portion 902 is configured to receive the material from the reservoir portion 910. The dispensing device 900 may be a separate device from the container and attached to the container by coupling the feeder portion 902 to the reservoir portion 910. The feeder portion 902 may have side walls that substantially correspond with side walls of the reservoir portion 910. Alternatively, the dispensing device 900 may form part of the container and the feeder portion 902 and the reservoir portion 910 may form a single element.

The dispensing device 900 further comprises a first rotatable gate 904 disposed at an end of the feeder portion 902 opposite the reservoir portion 910. The first rotatable gate is configured to rotate about a longitudinal axis of the dispensing device 900 between an open position that permits flow of the material to be dispensed out of the reservoir portion 910 via feeder portion 902, and a closed position that prevents flow of the material to be dispensed out of the reservoir portion 910 via feeder portion 902.

An adjustable-volume measuring chamber 906 is disposed at an outlet side of the first rotatable gate 904 (that is, the side of the first rotatable gate 904 away from the reservoir portion 910). The adjustable-volume measuring chamber 906 is configured to have an adjustable volume by expanding/contracting side walls in one or more directions. For example, the adjustable-volume measuring chamber 906 may expand/contract in a vertical direction (i.e. longitudinal direction of the dispensing device 900) and/or in a horizontal direction. The adjustable-volume measuring chamber 906 may have various indices indicating various volumes at different states of expansion/contraction, such that a user of the dispensing device 900 knows how much to expand/contract the adjustable-volume measuring chamber 906 to be at a desired volume. As discussed further below, the adjustable-volume measuring chamber 906 is configured to receive material to be dispensed, which is received from the reservoir portion 910 via feeder portion 902 when the first rotatable gate 904 is in the open position.

A second rotatable gate 908 is disposed at an end of the adjustable-volume measuring chamber 906 opposite the first rotatable gate 904. The second rotatable gate 908 is rotatable between an open position that permits flow of the material to be dispensed out of the adjustable-volume measuring chamber 906, and a closed position that prevents flow of the material to be dispensed out of the adjustable-volume measuring chamber 906.

In accordance with the configuration of the dispensing device 900, each of the first and second rotatable gates 904 and 908 can be opened and closed to control the flow of the material to be dispensed. In particular, when the first rotatable gate 904 is opened and the second rotatable gate 908 is closed and the dispensing device 900 is inverted, the material can flow from the reservoir portion 910 into the adjustable-volume measuring chamber 906. The first rotatable gate 904 may then be closed while the second rotatable gate 908 remains closed, isolating the volume of material to be dispensed in the adjustable-volume measuring chamber 906. Accordingly, an accurate volume of material retained in the adjustable-volume measuring chamber 906 can be ensured. The dispensing device 900 may even be returned to an upright position in this state with both the first and second rotatable gates closed, while retaining the material in the adjustable-volume measuring chamber 906. When a user wishes to dispense the material, the dispensing device 900 may be inverted with the first rotatable gate 904 closed and the second rotatable gate 908 opened to allow the entirety of the material within the measuring chamber to be dispensed.

Further, the dispensing device 900 may be configured so that the adjustable-volume measuring chamber 906 is rotatable, and the rotation of the adjustable-volume measuring chamber 906 causes rotation of both the first rotatable gate 904 and the second rotatable gate 908. As one example, the first rotatable gate 904 and the second rotatable gate 908 may be arranged at respective ends of the adjustable-volume measuring chamber 906 and coupled to the adjustable-volume measuring chamber 906, with one or more tabs that engage with the adjustable-volume measuring chamber 906, for example. As another example, one or more portions of the first rotatable gate 904 and/or the second rotatable gate 908 may be integrated with the adjustable-volume measuring chamber 906 at respective ends thereof.

Rotation of the adjustable-volume measuring chamber 906 in one direction may in particular cause one rotatable gate to open and the other rotatable gate to close, and rotation in the other direction causes the opposite. The adjustable-volume measuring chamber 906 may in particular be rotatable between three positions. When the adjustable-volume measuring chamber 906 is in a first position, the first rotatable gate 904 may be in the open position and the second rotatable gate 908 in the closed position. When the adjustable-volume measuring chamber 906 is in a second position, the first rotatable gate 904 may be in the closed position and the second rotatable gate 908 in the closed position. When the adjustable-volume measuring chamber 906 is in a third position the first rotatable gate 904 may be in the closed position and the second rotatable gate in the open position. This facilitates the flow of material to be dispensed as described above.

Different embodiments of a dispensing device in accordance with the present disclosure are described below. It would be appreciated by a person skilled in the art that various aspects of the different embodiments can be combined. As one example, a first rotatable gate in a dispensing device may correspond to a first rotatable gate described in one embodiment and a second rotatable gate may correspond to that described in another embodiment.

Figure 1:
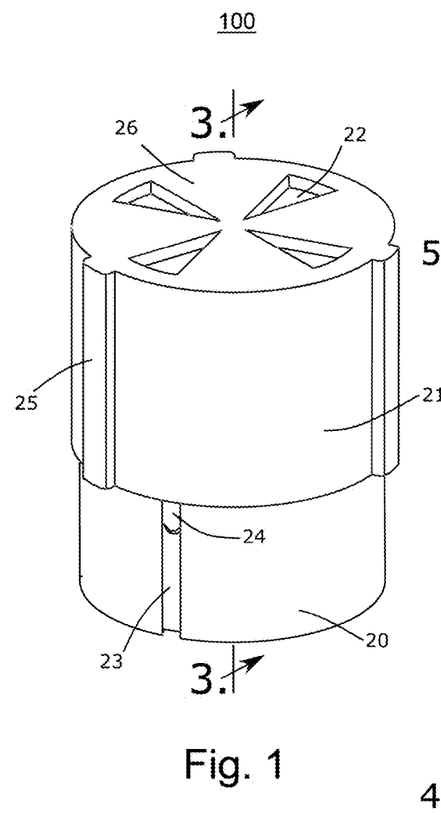
FIG. 1 is a perspective view of one embodiment of a dispensing device in accordance with the present disclosure.
Figure 2:
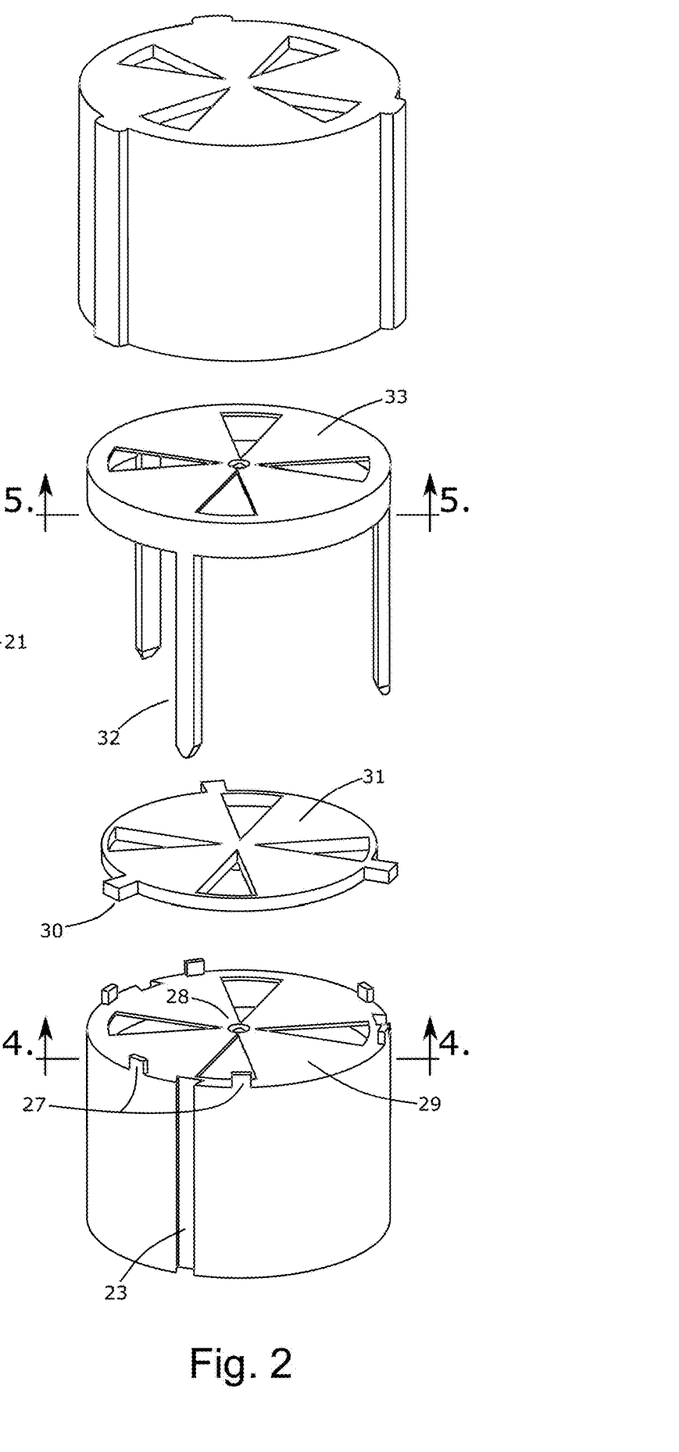
FIG. 2 is an exploded view of the embodiment of the dispensing device shown in FIG. 1.

FIG. 1 is a perspective view of one embodiment of a dispensing device 100 in accordance with the present disclosure. FIG. 2 is an exploded view of the embodiment shown in FIG. 1.

With reference to FIGS. 1 and 2, material that is desired to be dispensed flows from a feeder 20 that can be attached to a container using threads or form part of the container itself, through a first (bottom) rotatable gate into an adjustable measuring chamber 21, and then out a second (top) rotatable gate to be dispensed.

Each of the first and second rotatable gates in the dispensing device 100 respectively comprise a fixed portion with at least one aperture and a rotatable portion with a respective at least one aperture. In an open position the at least one aperture of the rotatable portion coincides with the at least one aperture of the fixed portion, and in the closed position all apertures of the rotatable portion does not coincide with the any aperture of the fixed portion.

Figure 3A:
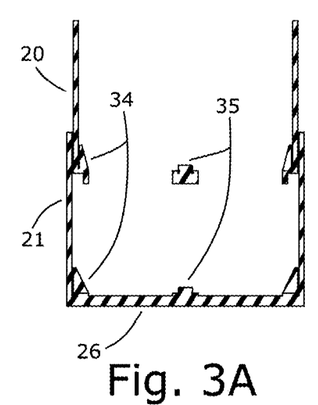
FIGS. 3A, 3B, and 3C are cross sectional views taken along line 3-3 of FIG. 1 at the three relevant rotational positions of the measuring chamber.

As can be seen in FIG. 2, the bottom rotatable gate comprises a bottom fixed portion 29 and a bottom rotatable portion 31. The bottom fixed portion 29 has a number of pie shaped apertures. In the dispensing device 100, the bottom fixed portion 29 is integrated at a top of the feeder portion 20. The bottom rotator portion 31 may be coupled to the bottom fixed portion 29, for example using a snap 35 (seen in FIG. 3) to attach to the bottom fixed portion 29 via its snap hole 28. Rotating the bottom rotatable portion 31 in one direction aligns its apertures with the apertures of the bottom fixed portion 29 allowing material to flow into the measuring chamber 21. Rotating the bottom rotatable portion 31 in the other direction causes the apertures of the bottom fixed portion 29 to be obscured by the bottom rotatable portion 31, preventing flow of material.

Likewise, the top rotatable gate comprises a top rotatable portion 26 and a top fixed portion 33. In the dispensing device 100, the top rotatable portion 26 is integrated with the adjustable-volume measuring chamber 21. The top rotatable portion 26 is coupled to top fixed portion 33, for example via a snap 35. Rotating the top rotatable portion 26 aligns its apertures 22 with the apertures of the top fixed portion 33 or obscures them, allowing or preventing flow of material from the measuring chamber.

The top fixed portion 33 remains rotationally fixed relative to the bottom fixed portion 29 by slipping sliders 32 into rails 23 of the bottom fixed portion 29 and feeder 20. The sliders 32 also allow for the measuring chamber 21 (coupled to the top fixed portion 33) to be moved relative to the feeder 20 to adjust the volume and can be held in place by but not limited to friction, teeth, or release button. The measuring chamber 21 may slide over the feeder 20 to create a closed volume. Tab rails 25 of the measuring chamber 21 slip over the tabs 30 of the bottom rotatable portion 31, such that rotating the measuring chamber 21 rotates both the top rotatable portion 26 and the bottom rotatable portion 31 of the top and bottom rotatable gates in unison. The bottom fixed portion 29 comprises a plurality of detents 27 that prevent over-rotation when the plurality of tabs 30 hit the detents 27.

Figure 3B:
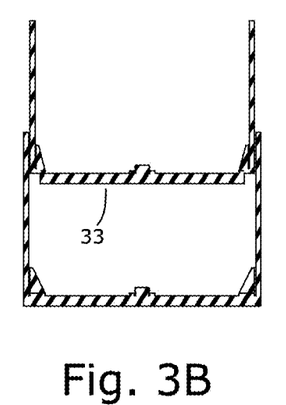
Figure 3C:
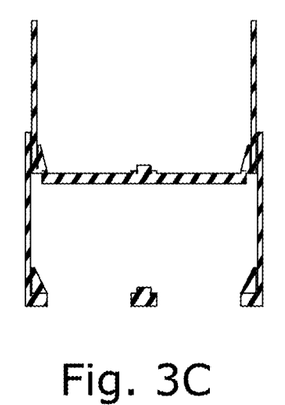
Figure 4A:
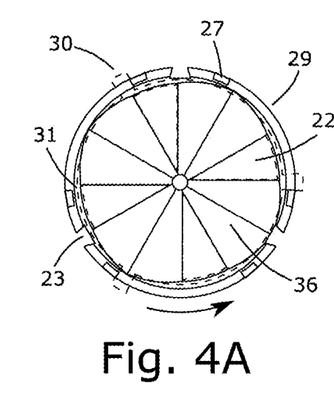
FIGS. 4A, 4B, and 4C are cross sectional views taken along line 4-4 of FIG. 2 showing the bottom rotational gate at the three relevant rotational positions of the measuring chamber.
Figure 4B:
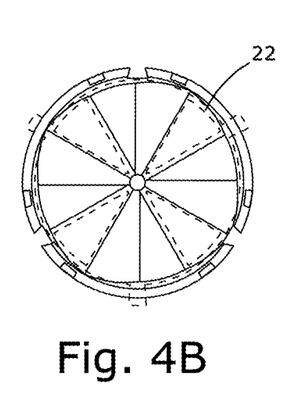
Figure 4C:
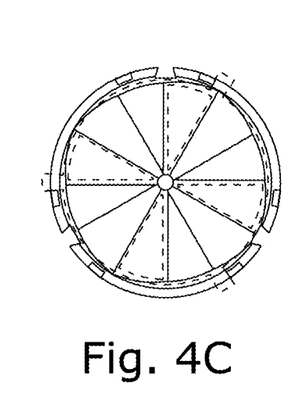
Figure 5A:
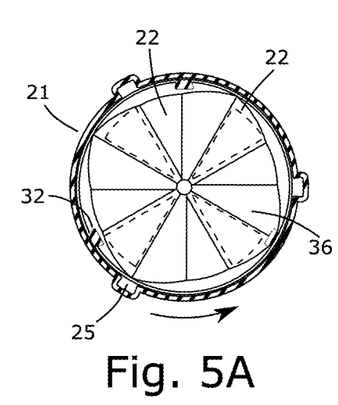
FIGS. 5A, 5B, and 5C are cross sectional views taken along line 5-5 of FIG. 2 showing the top rotational gate at the three relevant rotational positions of the measuring chamber.
Figure 5B:
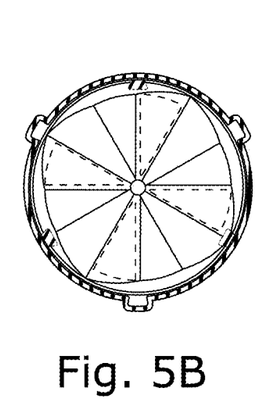
Figure 5C:
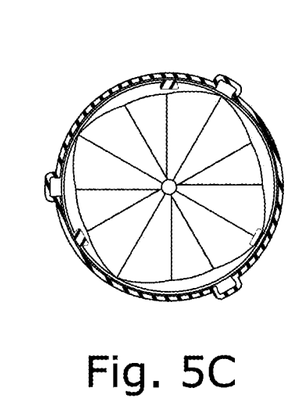

FIGS. 3A, 3B, and 3C are cross sectional views taken along line 3-3 of FIG. 1 at the three relevant rotational positions of the measuring chamber 21. The cross-sectional views shown in FIGS. 3A, 3B, and 3C show the dispensing device in an inverted state at three different positions: a first position when the first rotational gate (bottom rotational gate in FIG. 2) is in an open position and the second rotational gate (top rotational gate in FIG. 2) is in a closed position (FIG. 3A), a second position when the first rotational gate is in a closed position and the second rotational gate is in a closed position (FIG. 3B), and a third position when the first rotational gate is in a closed position and the second rotational gate is in a closed position (FIG. 3C). FIGS. 4A, 4B, and 4C are cross sectional views taken along line 4-4 of FIG. 2 showing the bottom rotational gate at the three relevant rotational positions of the measuring chamber shown in FIGS. 3A, 3B, and 3C. FIGS. 5A, 5B, and 5C are cross sectional views taken along line 5-5 of FIG. 2 showing the top rotational gate at the three relevant rotational positions of the measuring chamber shown in FIGS. 3A, 3B, and 3C.

FIGS. 4A, 4B, and 4C show the bottom fixed portion 29 and bottom rotatable portion 31 at three relevant rotational positions of the measuring chamber 21. Likewise, FIGS. 5A, 5B, and 5C show the top fixed portion 33 and top rotatable portion 26 at the same measuring chamber 21 rotational positions as FIG. 4. At the first rotational position, the apertures 22 of the bottom fixed portion 29 and the bottom rotatable portion 31 are aligned as shown in FIG. 4A. While at the same time, the apertures 22 of the top fixed portion 33 are obscured by the top rotatable portion 26. This allows material to move from the feeder 20 into the measuring chamber 21 without being able to exit, as shown in FIG. 3A.

The tabs 30 hitting the detents 27 prevent the measuring chamber 21 from being rotated further clockwise. Rotating counter-clockwise to the second position shows the apertures 22 of the bottom fixed portion 29 and the top fixed portion 33 obscured in FIG. 4B and FIG. 5B respectively. This prevents further material from entering the measuring chamber 21 while preventing the material from being dispensed, as shown in FIG. 3B. Further rotating the measuring chamber 21 counter-clockwise to the third position, the apertures 22 of the bottom fixed portion 29 are still obscured, while the apertures 22 of the top fixed portion 33 are aligned with those of the top rotatable portion 26 as shown in FIG. 4C and FIG. 5C respectively. This allows for the material to be dispensed from the measuring chamber 21 while preventing any further material flowing from the feeder 20, as shown in FIG. 3C.

The tabs 30 hitting the detents 27 prevent any further rotation of the measuring chamber 21 counter-clockwise. The dispensing process can be repeated by rotating the measuring chamber 21 back to the first position. The gates never being even partially open at the same time ensures only the measured amount of material is dispensed. The rotatable gates and/or the feeder 20 and measuring chamber 21 may comprise funnels 34 and wedges 36 to facilitate flow of the material out of the feeder 20 and measuring chamber 21.

Figure 6:
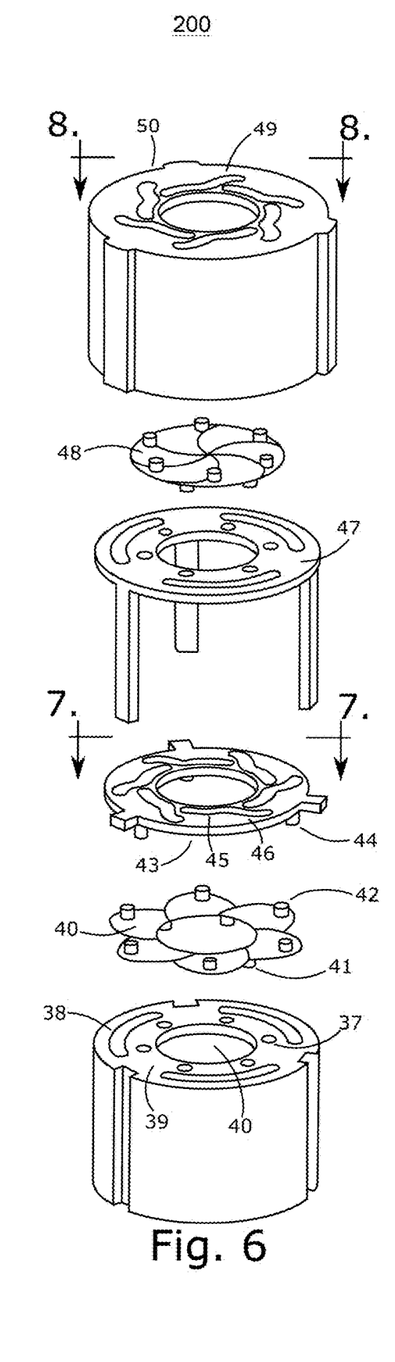
FIG. 6 is an exploded view of a second embodiment of a dispensing device in accordance with the present disclosure.

FIG. 6 is an exploded view of a second embodiment of a dispensing device 200 in accordance with the present disclosure, where the first and second rotatable gates comprise iris shutters instead of rotating sliding gates. Each of the first and second rotatable gates respectively comprise a plurality of rotatable blades rotatable between the open and closed positions, each blade having a rotator peg on a first surface thereof and an actuator peg on a second surface thereof. The first and second rotatable gates also comprise a respective mounting disk having rotator peg holes corresponding to rotator pegs of the plurality of blades, and each of the first and second rotatable gates comprise a respective actuator disk having a plurality of actuator slots corresponding to actuator pegs of the plurality of blades. Each actuator slot comprises an actuating portion and a delayed-open portion. The delayed-open portion is shaped to allow rotation of the actuator disk while maintaining the blades in a closed position.

As seen in FIG. 6, the first (bottom) rotatable gate comprises bottom blades 40 connected to a bottom mounting disk 39 by placing rotator pegs 41 into rotator peg holes 37. The bottom mounting disk 39 in the dispensing device 200 is integrated with the feeder portion. The bottom rotatable gate further comprises a bottom actuator disk 43 placed over the bottom mounting disk 39, with actuator pegs 42 of the blades 40 placed in either the bottom actuator slots 46 or the delayed-open slots 45. Having the rotator pegs 41 move through the bottom actuator slot 46 by rotating the bottom actuator disk 43 clockwise or counter-clockwise respectively opens or closes the bottom iris shutter by rotation of the blades 40.

Likewise, the second (top) rotatable gate comprises top blades 48 having a similar configuration as bottom lades 40. The top blades 48 are fit into the top mounting disk 47 by rotator pegs 41 and the top actuator disk 50 via actuator pegs 42. The top actuator disk 50 is integrated with the adjustable-volume measuring chamber. The top blades 48 and top actuator slots 49 are mirror images of the bottom blades 40 and bottom actuator slots 46, such that rotating the top actuator disk clockwise or counter-clockwise respectively closes or opens the top shutter, the opposite of the bottom shutter.

The actuator disks 43, 50 are connected to their respective mounting disks 39, 47 by fitting the rotation pegs 44 of the actuator disks into the rotation slots 38 of the mounting disks, allowing movement of the rotation peg within the rotation slot as the actuator disk rotates.

Otherwise, the dispensing device 200 is assembled in a similar manner as the dispensing device 100. For example, the feeder portion comprises a plurality of rails, and the top mounting disk 47 comprises a plurality of legs that interface with the plurality of rails and are configured to slide vertically within the plurality of rails as the volume of the adjustable-volume measuring chamber is adjusted. Further, the bottom actuation disk 43 of the first rotatable gate comprises a plurality of tabs, and the adjustable-volume measuring chamber comprises a plurality of tab rails that engage the plurality of tabs to cause rotation.

Figure 7A:
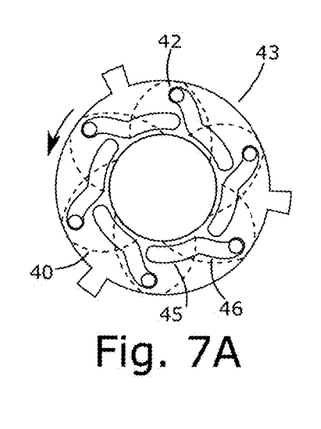
FIGS. 7A, 7B, and 7C are cross sectional views taken along line 7-7 of FIG. 6 showing the bottom rotational gate of the second embodiment at the three relevant rotational positions of the measuring chamber.
Figure 7B:
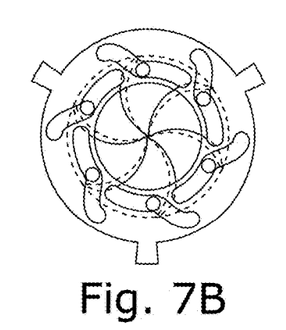
Figure 7C:
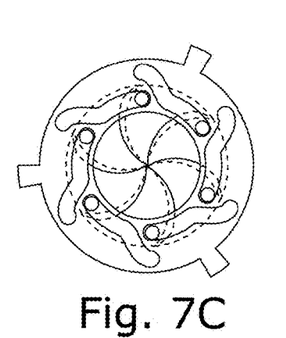
Figure 8A:
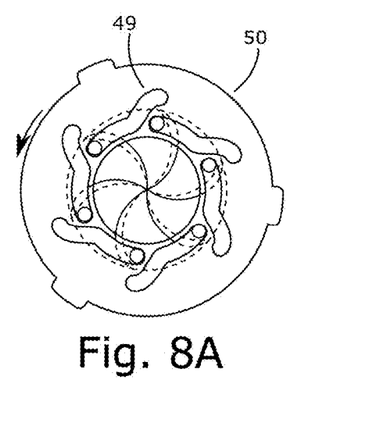
FIGS. 8A, 8B, and 8C are cross sectional views taken along line 8-8 of FIG. 6 showing the top rotational gate of the second embodiment at the three relevant rotational positions of the measuring chamber.
Figure 8B:
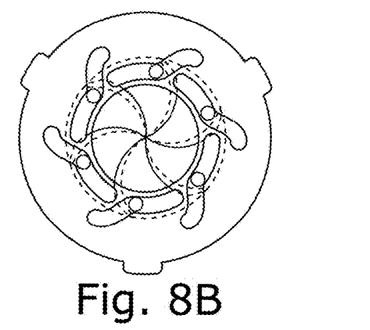
Figure 8C:
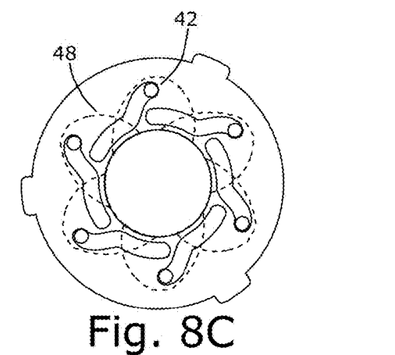

FIGS. 7A, 7B, and 7C are cross sectional views taken along line 7-7 of FIG. 6 showing the bottom iris shutter of the second embodiment at the three relevant rotational positions of the measuring chamber. FIGS. 8A, 8B, and 8C are cross sectional views taken along line 8-8 of FIG. 6 showing the top iris shutter of the second embodiment at the three relevant rotational positions of the measuring chamber. Namely, the three different positions are a first position when the first rotational gate (bottom rotational gate in FIG. 6) is in an open position and the second rotational gate (top rotational gate in FIG. 6) is in a closed position (FIG. 7A, 8A), a second position when the first rotational gate is in a closed position and the second rotational gate is in a closed position (FIG. 7B, 8B), and a third position when the first (bottom) rotational gate is in a closed position and the second (top) rotational gate is in a closed position (FIG. 7C, 8C).

FIGS. 7A, 7B, and 7C show the bottom actuator disk 43 and bottom blades 40 at three relevant rotational positions of the measuring chamber 21. Likewise, FIGS. 8A, 8B, and 8C show the top actuator disk 50 and top blades 48 at the same measuring chamber 21 rotational positions as FIG. 7. As the measuring chamber 21 is rotated counter-clockwise, the actuator pegs 42 of the bottom blades 40 move through the bottom actuator slots 46, closing the bottom iris shutter, going from FIG. 7A to FIG. 7B. At the same time, the actuator pegs 42 of the top blades 48 traverse the delayed-open slots 45, which because they are arcs of fixed radius at a closed position, cause the top iris shutter to remain closed from FIG. 8A to FIG. 8B. Continuing to rotate the measuring chamber 21 counter-clockwise, the actuator pegs 42 of the bottom blades 40 move through the delayed-open slots 45 keeping the bottom iris shutter closed from FIG. 7B to FIG. 7C. At the same time, the actuator pegs 42 of the top blades 48 move through the top actuator slots 49 to open the top iris shutter from FIG. 8B to FIG. 8C.

Figure 10A:
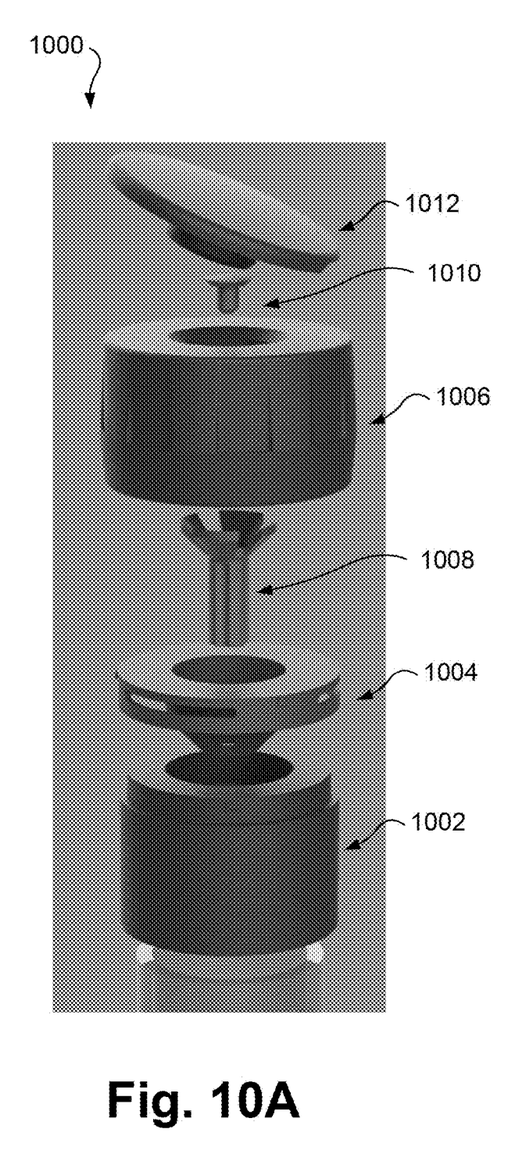
FIG. 10A-D show views of a rendering of an embodiment of a dispensing device in accordance with the present disclosure.
Figure 10B:
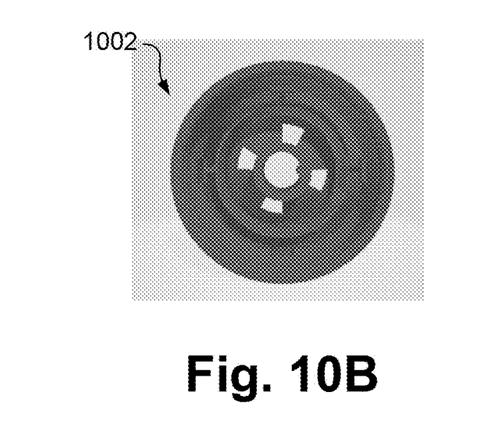
Figure 10C:
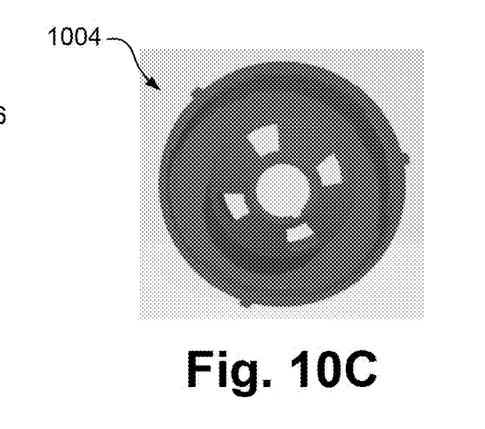
Figure 10D:
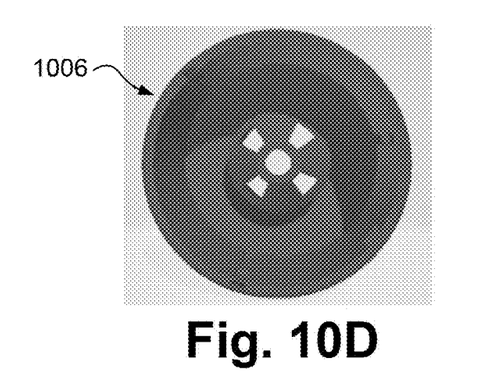

FIG. 10A shows an exploded view of a rendering of an embodiment of a dispensing device 1000 in accordance with the present disclosure. The dispensing device 1000 comprises a feeder portion 1002 having a fixed portion of a first rotatable gate disposed therein (see FIG. 10B), a rotatable portion 1004 of a first rotatable gate, an adjustable-volume measuring chamber 1006 having a rotatable portion of the second rotatable gate disposed therein (see FIG. 10D), a fixed portion 1008 of the second rotatable gate, the fixed portion 1008 of the second rotatable gate being configured to be rotationally fixed to the fixed portion of the first rotatable gate, and a pin 1010 coupling the rotatable portion of the second rotatable gate to the fixed portion 1008 of the second rotatable gate. A lid or cap 1012 is also provided, however since the second rotatable gate is operable to prevent unwanted flow of material from the adjustable-volume measuring chamber 1008, the cap 1012 may not be required. FIG. 10B shows a view from below of feeder portion 1002, showing the fixed portion of the first rotatable gate therein. FIG. 10C shows a view from below of the rotatable portion 1004 of the first rotatable gate. FIG. 10D shows a view from below of the adjustable-volume measuring chamber 1006, showing the rotatable portion of the second rotatable gate.

The dispensing device 1000 is another example of how different components of the dispensing device may have variations in shape. For example, the first and second rotatable gates have frusto-conical portions, which may help facilitate flow of the material to be dispensed within the dispensing device.

Figure 11:
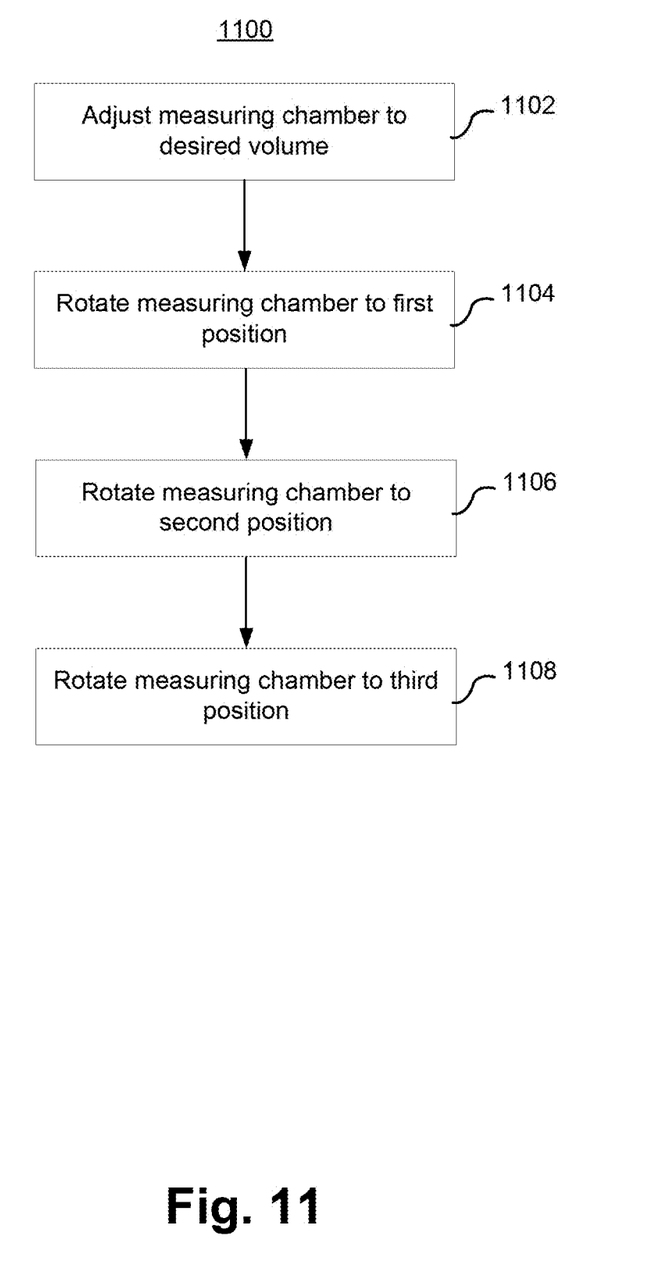
FIG. 11 shows a method operating a dispensing device in accordance with the present disclosure.

FIG. 11 shows a method 1100 operating a dispensing device in accordance with the present disclosure.

The method 1100 comprises adjusting an adjustable-volume measuring chamber to a desired volume (1102). As described above, the dispensing device in accordance with the present disclosure comprises: a feeder portion configured to couple with a reservoir portion storing a material to be dispensed and to receive the material from the reservoir portion; a first rotatable gate disposed at an end of the feeder portion opposite the reservoir portion, the first rotatable gate rotatable between an open position that permits flow of the material to be dispensed out of the reservoir portion, and a closed position that prevents flow of the material to be dispensed out of the reservoir portion; the adjustable-volume measuring chamber disposed at an outlet side of the first rotatable gate, the adjustable-volume measuring chamber configured to receive material to be dispensed, the adjustable-volume measuring chamber being adjustable to change a volume of material that can be received; and a second rotatable gate disposed at an end of the adjustable-volume measuring chamber opposite the first rotatable gate, the second rotatable gate rotatable between an open position that permits flow of the material to be dispensed out of the adjustable-volume measuring chamber, and a closed position that prevents flow of the material to be dispensed out of the adjustable-volume measuring chamber.

The method further comprises rotating the adjustable-volume measuring chamber to a first position (1104) to fill the adjustable-volume measuring chamber with the desired volume of material to be dispensed. Rotation of the adjustable-volume measuring chamber is configured to cause rotation of both the first rotatable gate and the second rotatable gate. In the first position, the first rotatable gate is in the open position and the second rotatable gate is in the closed position.

The method further comprises rotating the adjustable-volume measuring chamber to a second position (1106) to stop flow of the material to be dispensed out of the reservoir portion. In the second position, the first rotatable gate is in the closed position and the second rotatable gate is in the closed position.

The method further comprises rotating the adjustable-volume measuring chamber to a third position (1108) to dispense the material to be dispensed out of the adjustable-volume measuring chamber. In the third position the first rotatable gate is in the closed position and the second rotatable gate is in the open position.

It would be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. A dispensing device, comprising:
   a feeder portion configured to couple with a reservoir portion storing a material to be dispensed and to receive the material from the reservoir portion;
   a first rotatable gate disposed at an end of the feeder portion opposite the reservoir portion, the first rotatable gate rotatable between an open position that permits flow of the material to be dispensed out of the reservoir portion, and a closed position that prevents flow of the material to be dispensed out of the reservoir portion;
   an adjustable-volume measuring chamber disposed at an outlet side of the first rotatable gate, the adjustable-volume measuring chamber configured to receive material to be dispensed, the adjustable-volume measuring chamber being adjustable to change a volume of material that can be received;
   a second rotatable gate disposed at an end of the adjustable-volume measuring chamber opposite the first rotatable gate, the second rotatable gate rotatable between an open position that permits flow of the material to be dispensed out of the adjustable-volume measuring chamber, and a closed position that prevents flow of the material to be dispensed out of the adjustable-volume measuring chamber; and
   wherein the adjustable-volume measuring chamber is rotatable between a first position, a second position, and a third position, and wherein rotation of the adjustable-volume measuring chamber causes rotation of both the first rotatable gate and the second rotatable gate.

2. The dispensing device of claim 1, wherein the first rotatable gate and the second rotatable gate are configured at respective ends of the adjustable-volume measuring chamber such that when the adjustable-volume measuring chamber is in the first position, the first rotatable gate is in the open position and the second rotatable gate is in the closed position, when the adjustable-volume measuring chamber is in the second position, the first rotatable gate is in the closed position and the second rotatable gate is in the closed position, and when the adjustable-volume measuring chamber is in the third position the first rotatable gate is in the closed position and the second rotatable gate is in the open position.

3. The dispensing device of claim 1, wherein each of the first and second rotatable gates respectively comprise a fixed portion with at least one aperture and a rotatable portion with a respective at least one aperture, wherein in the open position the at least one aperture of the rotatable portion coincides with the at least one aperture of the fixed portion, and in the closed position each of the at least one aperture of the rotatable portion do not coincide with any of the at least one aperture of the fixed portion.

4. The dispensing device of claim 3, wherein the rotatable portion of the second rotatable gate is integrated with the adjustable-volume measuring chamber.

5. The dispensing device of claim 4, wherein the fixed portion of the first rotatable gate is integrated with the feeder portion.

6. The dispensing device of claim 5, wherein the feeder portion comprises a plurality of rails, and the fixed portion of the second rotatable gate comprises a plurality of sliders that interface with the plurality of rails and are configured to slide vertically within the plurality of rails as the volume of the adjustable-volume measuring chamber is adjusted.

7. The dispensing device of claim 6, wherein the rotatable portion of the first rotatable gate comprises a plurality of tabs, and wherein the adjustable-volume measuring chamber comprises a plurality of tab rails that engage the plurality of tabs.

8. The dispensing device of claim 7, wherein the fixed portion of the first rotatable gate comprises a plurality of detents that prevent over-rotation when the plurality of tabs hit the detents.

9. The dispensing device of claim 1, wherein each of the first and second rotatable gates respectively comprise a plurality of rotatable blades rotatable between the open and closed positions, each blade having a rotator peg on a first surface thereof and an actuator peg on a second surface thereof.

10. The dispensing device of claim 9, wherein each of the first and second rotatable gates comprise a respective mounting disk having rotator peg holes corresponding to rotator pegs of the plurality of blades, and wherein the rotator pegs of the plurality of blades are mounted to the corresponding rotator peg holes of the respective mounting disk.

11. The dispensing device of claim 10, wherein the mounting disk of the first rotatable gate is integrated with the feeder portion.

12. The dispensing device of claim 10, wherein the feeder portion comprises a plurality of rails, and the mounting disk of the second rotatable gate comprises a plurality of legs that interface with the plurality of rails and are configured to slide vertically within the plurality of rails as the volume of the adjustable-volume measuring chamber is adjusted.

13. The dispensing device of claim 10, wherein each of the first and second rotatable gates further comprise a respective actuator disk having a plurality of actuator slots corresponding to actuator pegs of the plurality of blades, and wherein the actuator pegs of the plurality of blades are mounted in corresponding actuator slots of the respective actuator disk.

14. The dispensing device of claim 13, wherein each actuator slot comprises an actuating portion and a delayed-open portion, and wherein a respective blade is in the closed position when the actuator peg is within the delayed-open portion.

15. The dispensing device of claim 13, wherein the actuator disk of the second rotatable gate is integrated with the adjustable-volume measuring chamber.

16. The dispensing device of claim 13, wherein the actuation disk of the first rotatable gate comprises a plurality of tabs, and wherein the adjustable-volume measuring chamber comprises a plurality of tab rails that engage the plurality of tabs.

17. The dispensing device of claim 13, wherein the respective actuator disks further comprise a plurality of rotation pegs, and the respective mounting disks comprise corresponding rotation slots for receiving a respective rotation peg and allowing movement of the rotation peg within the rotation slot as the actuator disk rotates.

18. The dispensing device of claim 1, further comprising the reservoir portion.

19. A method of operating a dispensing device, comprising:
adjusting an adjustable-volume measuring chamber of the dispensing device to a desired volume, wherein the dispensing device comprises:
a feeder portion configured to couple with a reservoir portion storing a material to be dispensed and to receive the material from the reservoir portion;
a first rotatable gate disposed at an end of the feeder portion opposite the reservoir portion, the first rotatable gate rotatable between an open position that permits flow of the material to be dispensed out of the reservoir portion, and a closed position that prevents flow of the material to be dispensed out of the reservoir portion;
the adjustable-volume measuring chamber disposed at an outlet side of the first rotatable gate, the adjustable-volume measuring chamber configured to receive material to be dispensed, the adjustable-volume measuring chamber being adjustable to change a volume of material that can be received; and
a second rotatable gate disposed at an end of the adjustable-volume measuring chamber opposite the first rotatable gate, the second rotatable gate rotatable between an open position that permits flow of the material to be dispensed out of the adjustable-volume measuring chamber, and a closed position that prevents flow of the material to be dispensed out of the adjustable-volume measuring chamber,
rotating the adjustable-volume measuring chamber to a first position to fill the adjustable-volume measuring chamber with the desired volume of material to be dispensed, wherein rotation of the adjustable-volume measuring chamber causes rotation of both the first rotatable gate and the second rotatable gate, and wherein in the first position, the first rotatable gate is in the open position and the second rotatable gate is in the closed position;
rotating the adjustable-volume measuring chamber to a second position to stop flow of the material to be dispensed out of the reservoir portion, wherein in the second position, the first rotatable gate is in the closed position and the second rotatable gate is in the closed position; and
rotating the adjustable-volume measuring chamber to a third position to dispense the material to be dispensed out of the adjustable-volume measuring chamber, wherein in the third position the first rotatable gate is in the closed position and the second rotatable gate is in the open position.

* * * * *